Nov. 18, 1947.  N. F. ANDREWS  2,431,016
CONVEYING MECHANISM FOR HUSKING ROLLS
Filed May 26, 1944  2 Sheets-Sheet 1

WITNESS
E. B. Bjurstrom

INVENTOR
NORMAN F. ANDREWS
BY
ATTORNEYS

Patented Nov. 18, 1947

2,431,016

UNITED STATES PATENT OFFICE 2,431,016

CONVEYING MECHANISM FOR HUSKING ROLLS

Norman F. Andrews, Moline, Ill., assignor to Deere & Company, Moline, Ill., a corporation of Illinois Application May 26, 1944, Serial No. 537,460

8 Claims. (Cl. 130—5)

The present invention relates generally to husking mechanism and more particularly to conveying mechanism for moving ears along the husking rolls.

The principal object of my invention relates to the provision of a novel and improved ear moving mechanism that is simple and inexpensive to manufacture but is efficient in operation, and is strong and durable.

I have found that efficient and satisfactory husking can be obtained by means of a hard wood smooth cylindrical husking roll in combination with a rubber husking roll having helically extending grooves and ridges which tend to move the ears of corn toward the discharge end of the rolls, the two rolls being set at an angle of approximately thirty degrees, inclined upwardly toward the discharge end. In corn pickers embodying this arrangement of husking mechanism, with a conveyor for depositing the snapped ears of corn at the receiving or lower ends of the husking rolls, there is some tendency under certain harvesting conditions for the ears to pile up at the lower ends of the rolls, making it necessary to provide some positive means for starting the ears moving along the rolls. In some conditions, it is sufficient to provide conveyor chains along the sides of the husking rolls, and having ear-engaging paddles extending over the rolls. In other conditions, however, I have found that even with this arrangement, the ears do not start moving along the rolls promptly enough to avoid accumulating at the receiving end of the rolls, for the conveyor chains and paddles sometimes merely move forwardly under the pile of ears with little more effect than to agitate the ears. Therefore, it is an object of this invention to provide ear moving means which are effective to start the ears moving along the rolls immediately, before they have a chance to accumulate. While I have tried several types of conveyors that are more positive in action than the type mentioned above, I have found that best results are not obtained from conveyor mechanism that is extremely positive in its action, for each ear of corn must interrupt its progression along the rolls during those moments in which the husking rolls are removing the husk from the ear. At such time, the ear must be free to rotate about its axis, without any progressive movement toward the discharge end of the husking rolls. Hence, an extremely positive ear conveyor which forces the ears along against the restraining action of the rolls upon the husks, will either cause the ears to be damaged by shelling or breaking, or will result in damage to the husking mechanism itself. Therefore, a further object of my invention has to do with the provision of conveying means that are sufficiently positive in action to start the ears moving along the husking rolls but permit some hesitation of the ears during the time they are being husked.

In the accomplishment of these objects, I have found that a combination of an auger conveyor extending along one side of the pair of husking rolls and an endless chain conveyor disposed along the opposite side of the husking rolls with ear engaging paddles extending over the adjacent roll, provides the proper amount of positive action in starting the ears along the husking rolls, without the difficulty mentioned above which accompanies an arrangement of conveying mechanism that is too positive in its operation.

Still another factor which determines the efficiency of a pair of husking rolls, is the time required to turn the ears parallel to the rolls so that the husks can be engaged by the husking rolls and stripped from the ears. Obviously, very little husking is accomplished when the ears travel along the husking rolls transversely thereto. A further object of my invention, therefore, has to do with the provision of means for quickly orienting the ears of corn parallel to the rolls so that they have the advantage of the frictional action of the rolls over the entire length of the latter.

In the accomplishment of this object I have found that by driving the auger and the conveyor chain at unequal rates of progression along the husking rolls, any ears that fall transversely of the rolls are quickly swung around into a parallel position.

All of the above objects and advantages apply to husking boxes comprising a single pair of husking rolls. These same advantages also apply to husking mechanisms including two pairs of husking rolls disposed side by side, but in this case there are even further advantages to be derived, for by placing the auger between the two pairs of rolls, the divider board which is conventional in husking boxes of the four-row type, is eliminated, for the auger thus not only acts as a conveyor but also as a divider, and is even more efficient in operation than a stationary divider, for the reason that any ears that fall transversely across the center line of the two pairs of rolls are actively urged into husking position on one of the pairs of husking rolls. Furthermore, the direction of rotation of the auger can be made such that it urges the transverse ears toward the pair of rolls which tend to receive the fewer number of ears, as is the case where the ear conveyor is perpendicular to the receiving ends of the husking rolls, so that the momentum of the ears tends to carry them to the pair of rolls farthest from the conveyor discharge.

These and other objects and advantages of my invention will be apparent to those skilled in the art after a consideration of the following description, in which reference is had to the drawings appended hereto, in which Figure 1 is a plan view of a corn harvester including a husking device embodying the principles of the present invention.

Figure 1:
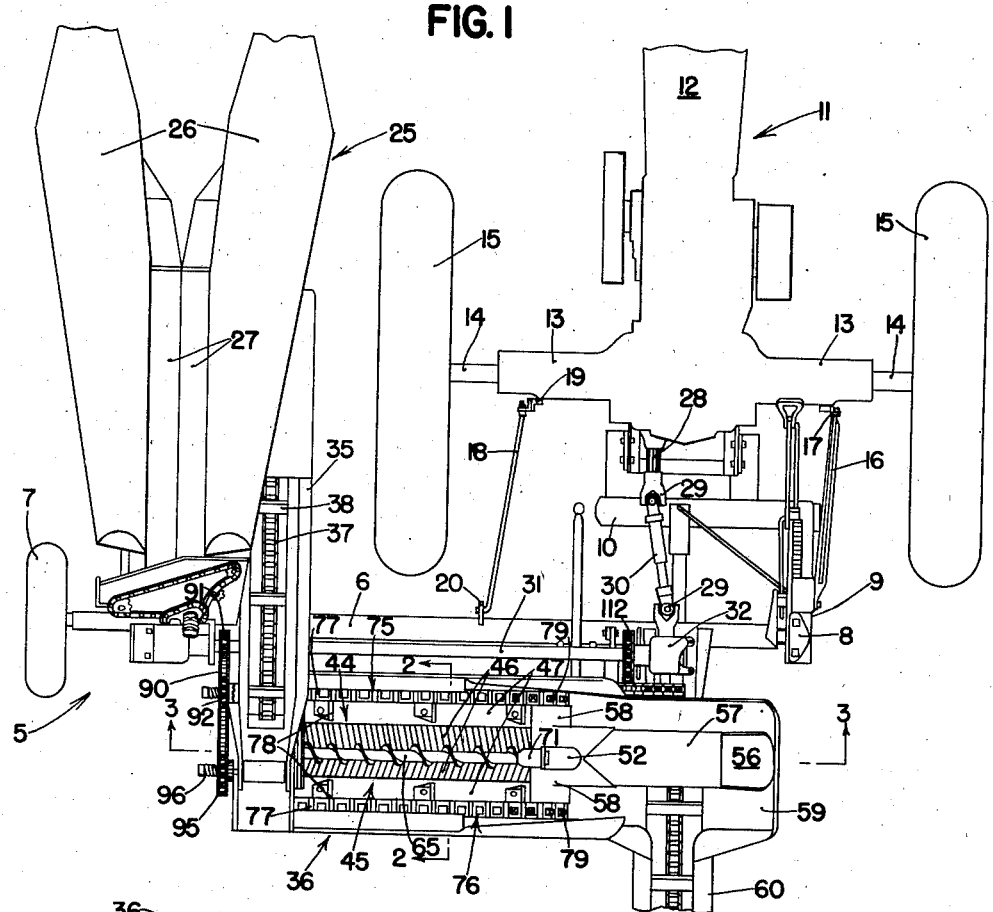

Referring now to the drawings, the corn harvester is indicated in its entirety by reference numeral 5 and is illustrative of the type of corn picker disclosed in Patent No. 2,337,592, granted December 28, 1943, to Coultas and Dort. It is to be understood, however, that the husking mechanism which is the subject of the present invention, is applicable to other types of corn harvesters, or can even be used as a stationary husking box, as is well-known to those skilled in the art. The corn harvester 5, described briefly, comprises a transverse beam 6, the outer end of which is supported on a ground-engaging wheel 7 and the inner end of which is carried in a universal joint, preferably a ball and socket joint 8, mounted on a rearwardly extending arm 9 fixed to a draft frame 10 of a tractor 11.

The tractor 11 comprises a longitudinally extending body 12 having laterally extending rear axle housings 13, within which are journaled axles 14 carried on rear traction wheels 15. The front end of the tractor is broken away. The arm 9 is also supported by means of a bracing member 16 connected to the arm 9 and inclined upwardly and forwardly therefrom, the forward end of the brace 16 being secured to a bracket 17 mounted on the rear implement supporting bosses which are conventionally provided on tractor axle housings. A draft link 18 is connected to a bracket 19 on the opposite axle housing 13, and the link 18 extends downwardly and rearwardly, and is swingably connected to a lug 20 welded to the intermediate portion of the main beam 6. Corn picking mechanism 25 is mounted on the main beam 6 near the outer end thereof, and comprises a pair of forwardly extending gatherers 26 rigidly mounted on the beam 6 and extending forwardly alongside the traction wheel 15. A pair of snapping rolls 27 are disposed between the gatherers 26 and are rotated by suitable power means, to which power is transmitted from the power take-off shaft 28 of the tractor, through a pair of universal joints 29 interconnected by a telescoping shaft 30, and connected to a transverse power shaft 31 journaled on the main beam 6 and extending outwardly along the latter. The power shaft 31 is driven by a pair of beveled gears (not shown) disposed within a gear box 32 mounted on the beam 6 behind the tractor.

As the implement moves forwardly in the field, the ears which are snapped from the stalks by the snapping rolls 27 are deposited in a conveyor trough 35 extending rearwardly from the picking unit 25 over the transverse beam 6 to a point of discharge over the husking unit 36. The ears are moved rearwardly within the conveyor trough 35 by means of an endless chain conveyor 37 having ear-engaging paddles 38 fixed thereto.

The husking unit 36 comprises a sheet metal box or trough having substantially vertical front and back walls 40, 41 and an end wall 42 extended upwardly and outwardly and serving as a chute to receive the ears of corn from the conveyor 35. The box 36 is also provided with a bottom closure 43 in the form of a trough. Within the box 36 are disposed two pairs of cooperative husking rolls 44, 45, each pair including a rubber roll 46 and a smooth cylindrical hardwood roll 47. Both the rubber and the wood are mounted on steel supporting shafts 48 of square cross section. The rubber rolls 46 are formed with a helical ridge or land 49 extending from one end of the roll to the other and these ridges are serrated or notched transversely of the ridges, in other words, longitudinally of the rolls, to improve the traction. Each pair of rolls is positioned with the ridges of the rubber roll disposed in contact with the surface of the wood roll and the two pairs of rolls are placed side by side with the two rubber rolls 46 adjacent each other and separated slightly to prevent contact therebetween. The outer, or receiving ends of the rolls are journaled in bearings 50 mounted in the end wall 42 of the husking box, while the inner or discharge end of the rolls are mounted in journal bearings 51, which are mounted in a wall of a gear case 52.

The rolls are disposed at an angle of approximately thirty degrees and are inclined upwardly from the receiving end of the rolls adjacent the conveyor 35 to the discharge end of the rolls, so that the ears must travel upwardly on the incline during the husking operation. The direction of progression of the helical ridges on the rubber rolls is such that during rotation of the rolls the ridges gently propel the ears upwardly on the incline. The husks and silks are grasped between the rolls of each pair and are stripped from the ears and dropped beneath the husking rolls into the trough 43. An angular stripping member 53 is disposed longitudinally between the two rubber rolls, the edges of which act as strippers to prevent husks and silks from being carried around the rubber rolls 46.

The husks and silks are moved upwardly along the inclined trough 43 by means of an auger 55, which is rotated during operation to convey the husks and silks through the trough and discharge them into a chute 56, which inclines downwardly from the discharge end of the trough 43, allowing the husks and silks to drop upon the ground behind the tractor. A hood 57 covers the end portion of the auger 55 to prevent any ears from falling into the trough 43 as they are discharged over an apron 58 into the receiving hopper 59 of a wagon elevator 60.

Coming now to that part of the mechanism with which the present invention is more directly concerned, an auger 65 is positioned on the center line of the husking box between the two inner husking rolls 46. The auger 65 comprises a shaft 66 and a helical vane 67 wound thereon. The outer diameter of the vane 67 is approximately equal to the diameter of each of the rolls 46, 47 and is positioned closely adjacent to the upper surfaces of the rubber rolls 46 so that the bottom of the auger is below and between the tops of the two adjacent rolls, although the auger is positioned so that the edge of the vane 67 does not touch the rolls 46. The vane 67 is wound about the shaft 66 in such a direction that the top of the auger vane moves forwardly, that is, in the opposite direction to the movement of the conveyor chain 37 and also, of course, tends to propel ears upwardly along the inclined rolls. With this arrangement, the ears that drop from the conveyor 37 upon the auger 65 are urged forwardly upon the front pair of rolls 44. This action tends to more equally distribute the ears upon the two pairs of husking rolls 44, 45, for the momentum of the ears as they are thrown rearwardly by the conveyor 37 has a tendency to pile the ears toward the rear of the husking box and thus overloading the rear pair of husking rolls 45. The lower end of the auger shaft 66 is journaled in a bearing 69 mounted on the end wall 42, and the upper end of the auger shaft is journaled in a bearing 70, which is mounted within the gear box 52. The auger vane 67 terminates somewhat short of the gear box 52 to provide room for a short wooden cylindrical member 71 on the shaft 66. The cylindrical member 71 is beveled at 72 adjacent the end of the vane 67. The purpose of this cylindrical wooden member 71 is to insure that any ears that are engaged by the auger at the upper end of the husking rolls are not pinched between the end of the auger vane and the gear box 52.

A pair of endless chain type conveyors 75, 76 are disposed at opposite sides of the husking box, respectively, each of which comprises a flexible endless chain 77 extending along the outer sides of the wood rolls 47 and substantially parallel thereto, and a plurality of ear-engaging paddles 78 fixed to the chain 77 at spaced intervals and extending laterally over the adjacent wood roll 47. Preferably, the paddles 78 terminate short of the center line of the pair of adjacent husking rolls, although in some conditions it might be desirable to provide longer paddles. The two chains 77 are trained over a pair of drive sprockets 79 near the discharge end of the husking rolls, the sprockets 79 being fixed to a drive shaft 80 that passes through the gear box 52. The chains 77 pass downwardly from the drive sprockets 79 and are trained under a pair of idler sprockets 81 which are mounted on suitable brackets (not shown) fastened to the sides of the husking box 36. The chains then pass downwardly parallel to the auger trough 43 and between the latter and the planes of the sides 40, 41 of the box, and are trained around a pair of idler sprockets 82 mounted on a shaft 83 that is journaled in a pair of sprockets 84 rigidly attached to the husking box near the receiving end thereof. The chains then pass upwardly over a pair of sprockets 85, from which they extend along the sides of the rolls 47 to the drive sprockets 79.

Power is supplied to the husking unit 36 through a drive chain 90, which is trained over a drive sprocket 91 on the drive shaft 31. The chain 91 passes over a drive sprocket 92 on the drive shaft 93 of the conveyor chain 37, the sprocket 92 being releasably connected to the shaft 93 through a conventional overload release clutch 94. The chain 90 is also trained over a sprocket 95, which drives the husking rolls through an overload clutch 96, and a universal joint 97, coupled to the end of the shaft 48 of the rubber roll 46 in the rear pair of husking rolls 45. Each of the four roll shafts 48 is provided with a gear 98 and the four gears 98 are intermeshed so that the four rolls are driven through the universal joint 97 from the sprocket 95.

Figure 2:
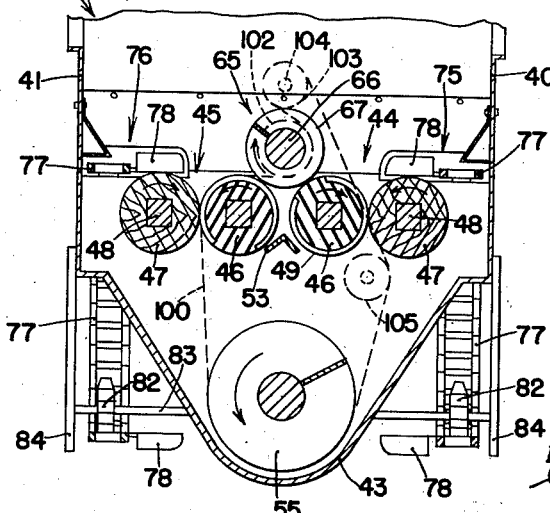
Figure 2 is a sectional elevational view taken along a line 2—2 in Figure 1, transversely of the husking rolls.
Figure 3:
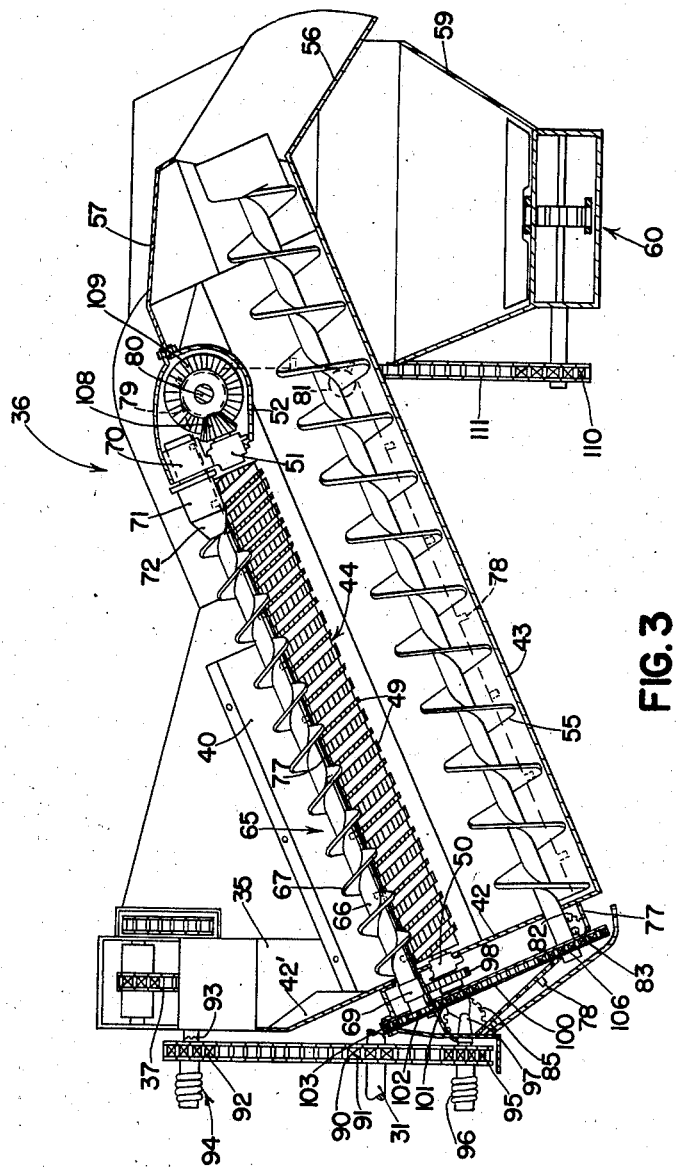
Figure 3 is a sectional elevational view taken along a line 3—3 in Figure 1, longitudinally of the husking rolls.

Power is transmitted to the two augers 55, 65 by means of a second power chain 100 which is trained over a sprocket 101 on the husking roll shaft 48 adjacent the universal joint 97. As best indicated in Figure 2, the chain 100 passes around a sprocket 102 fixed to the auger shaft 66 and then is trained upwardly over a small idler sprocket 103 which is supported on a stub shaft 104 on a portion of the housing of the husking mechanism. The chain 100 is also trained over a second idler 105 and engages a sprocket 106 on the shaft of the husk conveyor auger 55.

The opposite end of the husking roll shaft that is connected to the universal joint 97 carries a bevel pinion 108 which meshes with a bevel gear 109 fixed to the drive shaft 80, through which power is transmitted to drive the chain conveyor sprockets 79. The wagon elevator 60 is driven through a sprocket 110 by means of a chain 111 which is trained over a sprocket 112 mounted on the drive shaft 31.

During operation, the implement advances in the field, snapping the ears of corn from the stalks by means of the snapping rolls 27, conveying the ears rearwardly by the conveyor chain 37, depositing the ears at the receiving end of the husking rolls 44, 45. Some of the ears drop on one pair of rolls 44 and the rest drop on the rolls 45, but since the auger 65 rotates in a clockwise direction as viewed in Figure 2, most of the rolls which drop upon the auger 65 are thrown forwardly to the pair of rolls 44. An important feature of this invention resides in proportioning the pitch of the auger 65 and the speed of rotation of the auger shaft 66 so that the rate of progression at which the auger 65 moves an ear of corn is appreciably different than the rate of speed at which the paddles 78 of the chain conveyors 75, 76 advance toward the discharge end of the rolls. Preferably, the auger progresses at a greater rate of speed than the chain conveyors, although this relation can be reversed if desired. The important consideration, however, is that by this difference of speed, any ears that fall transversely across one or the other pairs of husking rolls, are quickly turned to position parallel to the husking rolls and thus drop into the recess between the two rolls of one of the pairs. The auger 65 also serves the purpose of preventing the ears from dropping between the two rubber rolls 46 as there would be no husking action in that location. Furthermore, in case a number of ears pile up at the receiving end of the husking rolls, the auger 65 is sufficiently aggressive in its action to move the ears out of the pile into husking position. Also, the chain conveyors 75 are sufficiently pliable so that they do not act so positively upon the ears that the latter are prevented from hesitating during the second or two that the husks are being stripped. However, the chain conveyors serve to keep the ears moving up the inclined rolls and the ears are discharged over the apron 58 on opposite sides of the divider hood 57, into the elevator hopper 59.

The husks from both pairs of rolls drop into the trough 43 where they are moved by the husk auger 55 and are discharged through the chute 56 to the ground.

I do not intend my invention to be limited to the exact details shown and described herein except as set forth in the claims which follow.

I claim:

1. In husking mechanism, the combination of two pairs of husking rolls disposed in side by side arrangement, a conveyor along the outer side of each pair of rolls and movable toward the discharge end of the rolls for urging the ears thereto, an auger positioned between the two pairs of rolls and substantially parallel thereto, close to the adjacent rolls to exclude ears from between the latter, and means for rotating said auger to produce a movement of the auger vane to urge the ears toward the discharge end of said rolls but at a speed of progression that is different from the speed of said conveyors, whereby any ears that fall transversely upon the rolls and auger are straightened parallel thereto.

2. In husking mechanism, the combination of two pairs of husking rolls, each pair of rolls being disposed parallel in juxtaposition for grasping husks and silks and removing them from the ears, said two pairs of rolls being disposed substantially parallel to each other, a conveyor along the outer side of each pair of rolls and movable toward the discharge end of the rolls for urging the ears thereto, an auger disposed between said pairs of rolls and comprising a shaft and a helical vane mounted thereon, said auger being mounted for rotation about an axis positioned above the axes of the adjacent rolls so that the edge of said vane beneath said auger extends below the tops of said rolls and is in close proximity to the latter to prevent ears from lodging between said pairs of rolls, and means for rotating said auger to produce a movement of the auger vane to urge the ears toward the discharge end of said rolls but at a speed of progression that is different from the speed of said conveyors, whereby any ears that fall transversely upon the rolls are straightened parallel thereto.

3. In husking mechanism, the combination of two pairs of husking rolls, each pair of rolls being disposed parallel in juxtaposition for grasping husks and silks and removing them from the ears, said two pairs of rolls being disposed substantially parallel to each other, a pair of endless chain type conveyors having ear engageable paddles movable over said pairs of rolls, respectively, to urge the ears toward the discharge end of the rolls, an auger disposed between said pairs of rolls and rotatable about an axis disposed higher than the axes of the adjacent rolls and in close proximity to the latter to prevent ears from lodging therebetween, and means for rotating said auger to produce a progression of the auger vane toward the discharge end of said rolls at a speed higher than the speed of said chains, whereby any ears that fall transversely across said auger and one of said conveyors are straightened parallel to the rolls.

4. In husking mechanism, the combination of a pair of cooperative husking rolls, an ear engaging auger disposed along one side of said pair of rolls and an endless conveyor chain disposed along the opposite side of said pair of rolls and having ear engaging members fixed to said chain and extending over the adjacent husking roll, said auger being positioned close to the adjacent roll to prevent ears from passing between the latter and said auger.

5. In husking mechanism, the combination with a pair of cooperative husking rolls of a pair of ear moving devices extending along opposite sides of said pair of rolls, respectively, one of said devices comprising an auger and the other device comprising an endless conveyor chain having ear engaging members fixed thereto and extending over the adjacent roll, said auger being positioned close to the adjacent roll to prevent ears from passing between the latter and said auger, and means for driving said ear moving devices at relatively different speeds of progression, whereby ears that fall transversely across the rolls are straightened parallel thereto.

6. In husking mechanism, the combination with a pair of cooperative husking rolls rotatably disposed on parallel axes that incline upwardly from the receiving end of the rolls to the discharge end of the rolls, of a pair of ear moving devices extending along opposite sides of said pair of rolls, respectively, one of said devices comprising an auger positioned close to the adjacent roll to prevent ears from passing between the latter and said auger, and the other device comprising an endless conveyor chain having ear engaging members fixed thereto and extending over the adjacent roll, and means for driving said ear moving devices at relatively different speeds of progression, whereby ears that fall transversely across the rolls are straightened parallel thereto.

7. In husking mechanism, the combination with a pair of cooperative husking rolls rotatably disposed on parallel axes that incline upwardly from the receiving end of the rolls to the discharge end of the rolls, of a pair of ear moving devices extending along opposite sides of said pair of rolls, respectively, one of said devices comprising an auger having a diameter substantially equal to that of one of said rolls and rotatably mounted above and offset outwardly from the center of the adjacent roll, said auger being positioned close to the adjacent roll to prevent ears from passing between the latter and said auger, and the other device comprising an endless conveyor member having ear engaging parts extending inwardly over the adjacent husking roll.

8. In husking mechanism, the combination with a pair of cooperative husking rolls rotatably disposed on parallel axes that incline upwardly from the receiving end of the rolls to the discharge end of the rolls, of a pair of ear moving devices extending along opposite sides of said pair of rolls, respectively, one of said devices comprising an auger having a diameter substantially equal to that of one of said rolls and rotatably mounted above and offset outwardly from the center of the adjacent roll, said auger being positioned close to the adjacent roll to prevent ears from passing between the latter and said auger, the other device comprising an endless conveyor member having ear engaging parts extending inwardly over the adjacent husking roll, and means for driving said ear moving devices at relatively different speeds of progression, whereby ears that fall transversely across the rolls are straightened parallel thereto.

NORMAN F. ANDREWS.

REFERENCES CITED

The following references are of record in the file of this patent:

UNITED STATES PATENTS

| Number | Name | Date |
|---|---|---|
| 68,085 | Kenyon | Aug. 27, 1867 |
| 573,500 | Woodman | Dec. 22, 1896 |
| 110,061 | Meadow | Dec. 18, 1870 |
| 2,337,592 | Coultas et al. | Dec. 28, 1943 |
| 1,922,374 | Krause | Aug. 15, 1933 |
| 856,828 | Wilson et al. | June 11, 1907 |